(No Model.)

G. M. HINKLEY.
SAW GUIDE.

No. 477,861. Patented June 28, 1892.

ON LINE X-X

Witnesses

George M. Hinkley
Inventor
by his attorneys
Dodge & Sons

THE NORRIS PETERS CO., PHOTO-LITHO., WASHINGTON, D. C.

United States Patent Office.

GEORGE M. HINKLEY, OF MILWAUKEE, WISCONSIN, ASSIGNOR OF ONE-HALF TO THE EDWARD P. ALLIS COMPANY, OF SAME PLACE.

SAW-GUIDE.

SPECIFICATION forming part of Letters Patent No. 477,861, dated June 28, 1892.

Application filed March 21, 1892. Serial No. 425,757. (No model.)

*To all whom it may concern:*

Be it known that I, GEORGE M. HINKLEY, a citizen of the United States, residing at Milwaukee, in the county of Milwaukee and State of Wisconsin, have invented certain new and useful Improvemets in Saw-Guides, of which the following is a specification.

My invention relates to sawmill-guides, and is designed, primarily, as an improvement upon that for which Letters Patent of the United States No. 164,301 were issued to me June 8, 1875.

Figure 1:
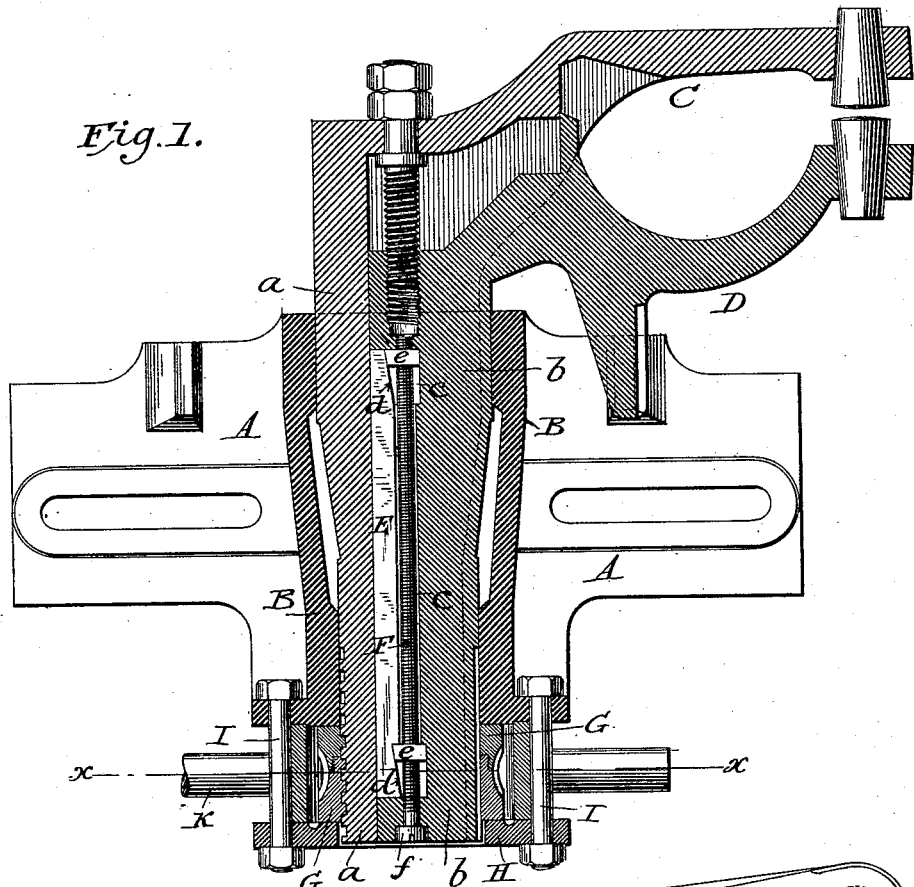
Figure 2:
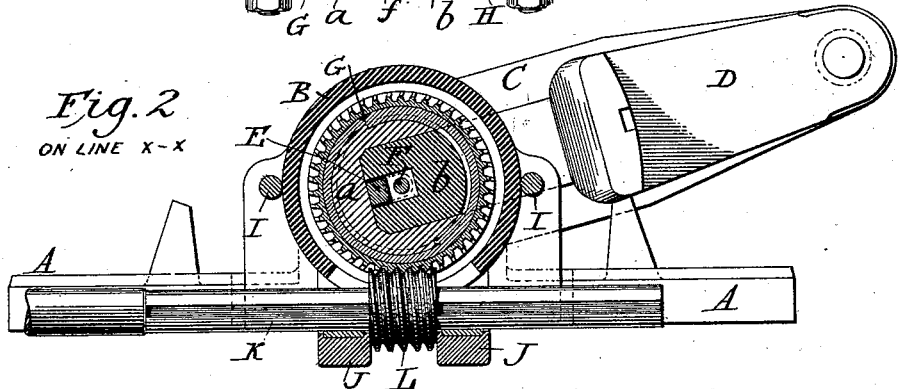

In the accompanying drawings, Figure 1 is a horizontal sectional view through my improved saw-guide; Fig. 2, a vertical transverse sectional view on the line $x\,x$, and Figs. 3 and 4 views illustrating certain details of construction hereinafter referred to.

In its general plan of construction the present guide resembles that shown in my patent before referred to—that is to say, it comprises a bed frame or plate A, having a cylinder B, in which are journaled the shanks or stems $a\,b$ of the guide-arms C D, the said shanks $a\,b$ constituting a tubular stem, upon which the guide-arms may swing from one side to the other. The shank $a$ of the outside guide-arm C is slotted longitudinally, as shown in Figs. 1 and 2, to receive the shank or stem of the inner guide-arm. After constant use it is found that these stems or shanks of the guide become worn, so as to permit considerable play within the cylinder. To overcome this defect is the object of the first part of my invention, which consists in making the shank or stem of the guide-arms expansible radially, so as to fill up the space within the cylinder and prevent any wabbling, which would be of serious moment with a large saw running at a great speed. To provide for this adjustment of the shank or stem of the guide-arm, I groove or slot the shank or stem $b$ longitudinally, as shown at $c$, Figs. 1 and 2, and I mount within this slot a bar or rod E, which is of a height less than the depth of the slot, but of a length corresponding exactly with that of the slot. Upon each end of this bar or rod E, I form the inclines $d$, which are adapted to receive the nuts or blocks $e$, as shown in Figs. 1 and 2. These nuts or blocks are advisably of the same width as the slots and bear at one end or side against the inclined faces $d$ and at the opposite side or end against the bottom wall of the slot $c$, as shown in Figs. 1 and 2.

F indicates a screw, which passes freely through the slot $c$ and also through and engages the nuts or blocks $e\,e$. This screw is provided with a head or enlargement $f$, so that when the said screw is turned or rotated it will be prevented from moving lengthwise. When, however, the screw is turned, the nuts which are held against rotation will be moved inwardly up the inclined faces $d$, and as they thus move they will spread the parts $a$ and $b$ slightly and cause them to completely fill the bearing made for them in the cylinder B. By this means an accurate adjustment of the shanks or stems of the guide-arms is possible at all times.

Upon reference to Figs. 1 and 2 it will be noticed that the shank of the arm C is threaded circumferentially and both project beyond the ends of the cylinder B, and upon the projecting end of the arms or shanks I mount a combined worm-wheel and nut G, which is held against the end of the cylinder by means of a cap-plate H, secured to the cylinder or to the bed or frame by means of bolts I.

Figure 3:
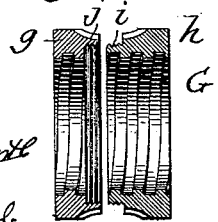
Figure 4:
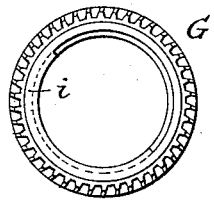

Mounted in suitable bearings J, formed on the bed plate or frame A in a plane at right angles to the shanks or stems of the guide-arms, is a shaft K, upon which is mounted a worm L, which, as shown in Fig. 2, meshes with and is designed to impart motion to the combined nut and worm-wheel G. This worm L is feathered to the shaft K, so as to turn or rotate therewith, but allowing a free end movement of shaft K, and is prevented from moving endwise, and thereby becoming disengaged from the worm-wheel, by reason of the arms or bearings J J, which bear upon the worm at opposite ends. By withdrawing the shaft from the worm the worm is permitted to drop down through the space between the arms J J and out of engagement with the worm-wheel G. Under the prior construction above referred to this nut was placed at a point between the ends of the guide-arms, and it was found that the threads on the inner circumference of the nut or worm-wheel G and the exterior of the shanks or stems of the guide-arms wore considerably by use, thereby permitting an end movement of the arms, which is a serious objection to a saw-guide. To overcome this objection and to provide for taking up all lost motion in the threads, I make the worm-wheel and nut G in two parts $g$ and $h$, as shown in Figs. 1, 2, and 3, the nut or wheel G being divided in a plane at right angles to the axis, the portion $h$ being provided with an externally-threaded portion $i$ to engage a correspondingly-threaded socket $j$ in the part $g$. The outer part of the nut—that is, that portion in which the teeth for the worm are formed—is preferably parted or divided in the center, and the two parts are screwed together, as shown in Figs. 1 and 3; but the line of division of the internal main threads is not a matter of consequence. When the threads on the inner circumference of the nut and on the exterior of the guide-arm are worn sufficiently to allow or permit end-play of the arms through the nut, I disengage the worm from the nut by withdrawing the shaft, as previously stated, and I then turn or rotate one portion of the combined nut and worm-wheel relatively to the other part, thereby separating the threads on the inside of section $h$ a sufficient distance from those on the inside of section $g$ to take up all lost motion in the threads. Of course it only requires a very minute adjustment or movement of one part of the nut and worm-wheel relatively to the other part to effect the desired result. This adjustment does not appreciably affect the teeth to receive the worm and after once adjusted and in place the two sections of the combined nut and worm-wheel are prevented from getting out of adjustment by reason of the teeth or thread of the worm engaging the teeth of the worm-wheel.

I do not wish to restrict myself in the present instance to the employment of a worm and worm-wheel, as it is obvious that this large nut G may be turned or rotated by hand and held in position by means of a spring-pawl or other locking device, as shown in my prior patent.

While I have shown the arm or rod E as provided with two inclined faces or wedges $d$ and have shown two nuts or blocks $e$ to work thereon, I do not wish to limit myself to any precise number of inclined faces or wedges and nuts, as it is obvious that the number may be varied without departing from my invention. I prefer to employ two, however, as it enables me to adjust both ends of the guide-arms equally and uniformly.

While I have referred to the part D, which forms a bearing for the guide-arms, as a "cylinder," I do not wish by the use of this term to restrict myself to any particular form of blocks or bearings for the guide-arms.

Having thus described my invention, what I claim is—

1. In a saw-guide, the combination, with the base frame or plate having a cylinder B, of a pair of saw-guide arms C and D, journaled in the cylinder, and means for expanding and separating those portions of said arms within the cylinder, whereby compensation may be made for wear of the arms or the cylinder, all substantially as shown and described.

2. In a saw-guide, the combination, with the base frame or plate A, having a cylinder B, of the saw-guide arm C, provided with a shank or stem $a$, a guide-arm D, provided with a stem or shank $b$, which is seated within the stem or shank $a$ and is provided with a longitudinal groove $c$, a block or bar E, mounted within the slot or groove $c$ and provided with an incline or inclines $d$, a screw F, swiveled in the shank or stem $b$, and blocks or nuts $e$, through which the screw passes, bearing at opposite faces against the bottom wall of the slot and the inclined faces of the bar.

3. In a saw-guide, the combination, with a base frame or plate, of a pair of guide-arms journaled therein and one of which is threaded externally, and a nut mounted upon the ends of the guide-arms and prevented from moving longitudinally with reference thereto, said nut being made in two parts or sections adjustable one with reference to the other, whereby compensation may be made for the wear of the threads upon the arms and in the nut.

4. In combination with base frame or plate A, having a bearing or cylinder B, the guide-arms C D, journaled therein and one of which is threaded externally, and a nut G, mounted thereon and made in two sections $g$ and $h$, one of said sections being provided with a threaded collar to enter or engage a threaded socket formed in the other section.

5. In a saw-guide, the combination, with a frame or plate A, of the guide-arms C D, journaled therein and one of which is threaded externally, a nut G, applied to the end of the bearing for the arms and engaging the thread on the latter, a cap-plate H, bearing upon the outer face of the nut, and bolts I, connecting the cap-plate to the bed or frame.

6. In combination with bed or frame A, the guide-arms C D, journaled therein and one of which is threaded externally, the two-part nut and worm-wheel mounted upon the ends of the arms, the worm engaging the said worm-wheel, and the shaft detachably connected with the worm-wheel.

7. In combination with bed or frame A, provided with cylinder B and bearings J J, the guide-arms C D, mounted in the cylinder B and one of which is threaded externally, the two-part nut and worm-wheel G, mounted upon the ends of the arms between the end of the cylinder and a cap-plate H, bolted to the latter, a shaft K, mounted in the bearings J J, and worm-wheel L, feathered to the shaft and embraced by the bearings J J, all substantially as shown and described.

In witness whereof I hereunto set my hand in the presence of two witnesses.

GEORGE M. HINKLEY.

Witnesses:
W. W. ALLIS,
FRANK W. GREENLEAF.